United States Patent [19]

Hayes

[11] Patent Number: 4,782,968
[45] Date of Patent: Nov. 8, 1988

[54] COMPOSITE CLOSURE AND METHOD OF MANUFACTURE

[75] Inventor: Thomas H. Hayes, Lancaster, Ohio

[73] Assignee: Anchor Hocking Corporation, Lancaster, Ohio

[21] Appl. No.: 39,747

[22] Filed: Apr. 20, 1987

[51] Int. Cl.⁴ .............................................. B65D 53/00
[52] U.S. Cl. ..................... 215/276; 215/350; 215/DIG. 2
[58] Field of Search ............... 215/227, 252, 276, 350, 215/352, DIG. 2, 232, 274, 275; 156/69, 73.5

[56] References Cited

U.S. PATENT DOCUMENTS

| | | | |
|---|---|---|---|
| 957,064 | 5/1910 | Keeran | 215/276 |
| 2,195,422 | 4/1940 | Overmyer | 215/276 |
| 2,403,287 | 7/1946 | Keith | 215/350 |
| 3,499,568 | 3/1970 | Riera | 215/276 |
| 3,924,772 | 12/1975 | Magnani | 215/276 |
| 4,254,884 | 3/1981 | Maruyama | 215/232 |
| 4,396,655 | 8/1983 | Graham et al. | 215/DIG. 2 |
| 4,658,976 | 4/1987 | Pohlenz | 215/252 |

FOREIGN PATENT DOCUMENTS 2510058 9/1975 Fed. Rep. of Germany ...... 215/350

Primary Examiner—Stephen Marcus
Assistant Examiner—Nova Stucker
Attorney, Agent, or Firm—Stoll, Wilkie, Previto & Hoffman

[57] ABSTRACT

An improved composite closure is described which has a cover portion which is at least partially plastic and a molded plastic ring portion. The molded ring also permits the cover to be inserted from the top of the ring rather than just upwardly over the ring threads and permits a plastic to plastic engagement or attachment of cover and ring.

5 Claims, 2 Drawing Sheets

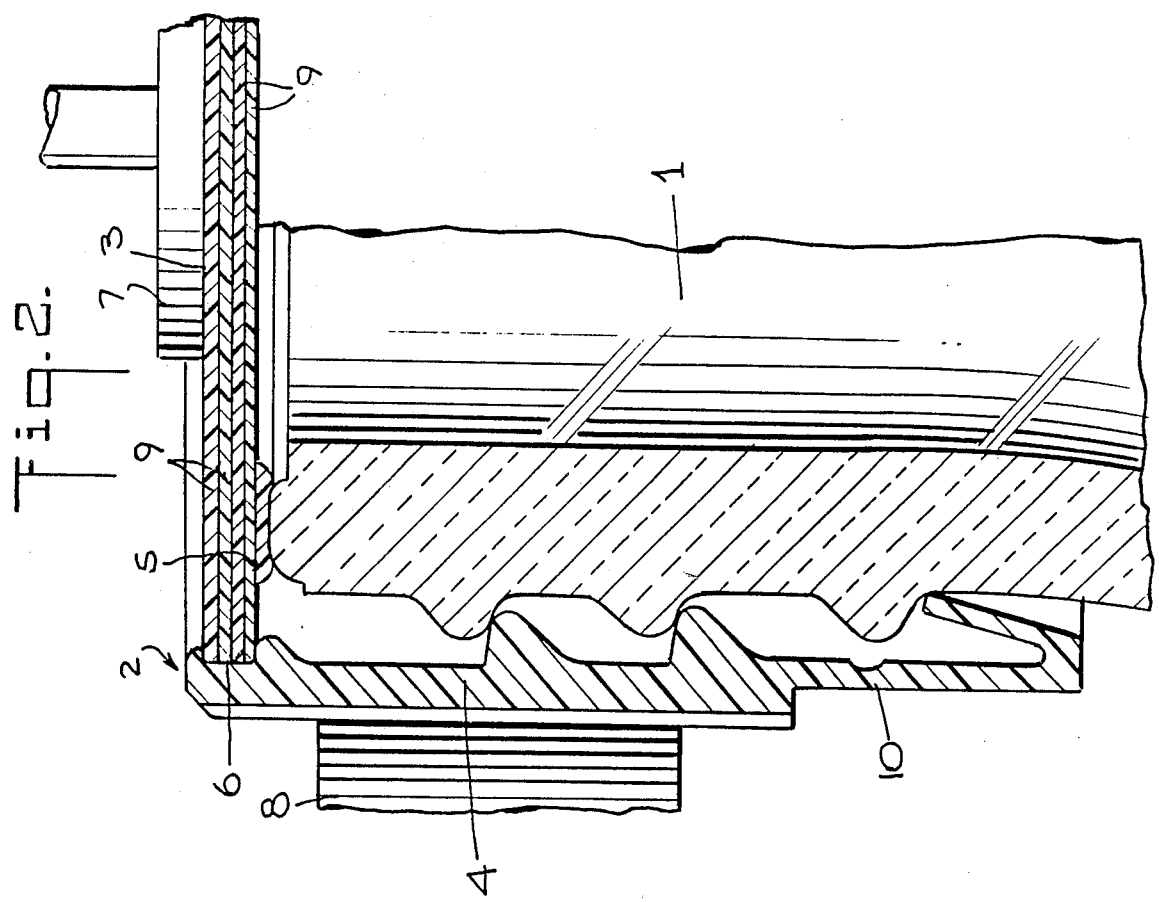
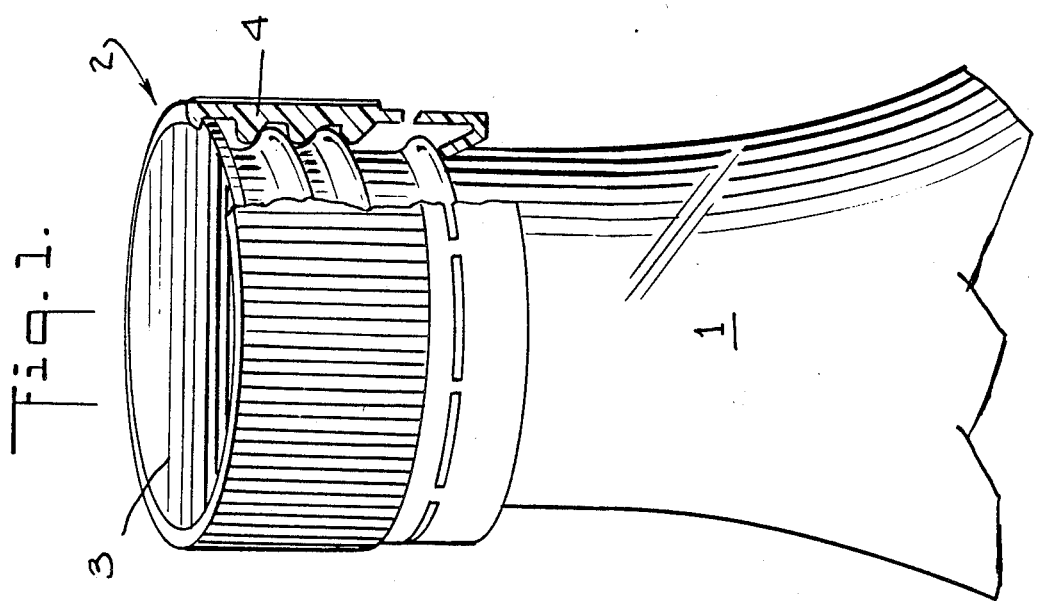

COMPOSITE CLOSURE AND METHOD OF MANUFACTURE

BACKGROUND OF THE INVENTION

The present invention relates to an improved composite closure and its method of manufacture and more particularly to a composite closure having a molded plastic ring or skirt portion and a cover portion which is at least partially plastic and which may be attached by a plastic to plastic bond to the top of the ring portion.

There are presently in use a number of composite closure caps for sealing containers which comprise a molded plastic ring or skirt portion and a metallic cover or disk which is inserted into the upper portion of the ring for completing the closure.

The present closure has a cover which is preferably at least partially plastic and in which a plastic to plastic bond attaches the cover to the ring in certain instances.

Accordingly, a method is provided where the plastic cover is bonded to the plastic ring by a plastic to plastic bond.

The composite closure cap of the present invention provides a new means for attaching separate cap covers to the tops of molded plastic ring portions.

Accordingly, the object of the present invention is to provide an improved composite closure cap and a method of manufacture.

Another object of the present invention is to provide an improved composite closure cap with a means for attaching a separate plastic cover.

Other and further objects of the present invention will become apparent upon an understanding of the illustrative embodiments about to be described, or will be indicated in the appended claims, and various advantages not referred to herein wil occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of a composite closure in accordance with the invention.

FIG. 2 is a partial vertical sectional view of the closure cap of FIG. 1.

DESCRIPTION OF THE PREFERRED EMBODIMENT

Figure 4:
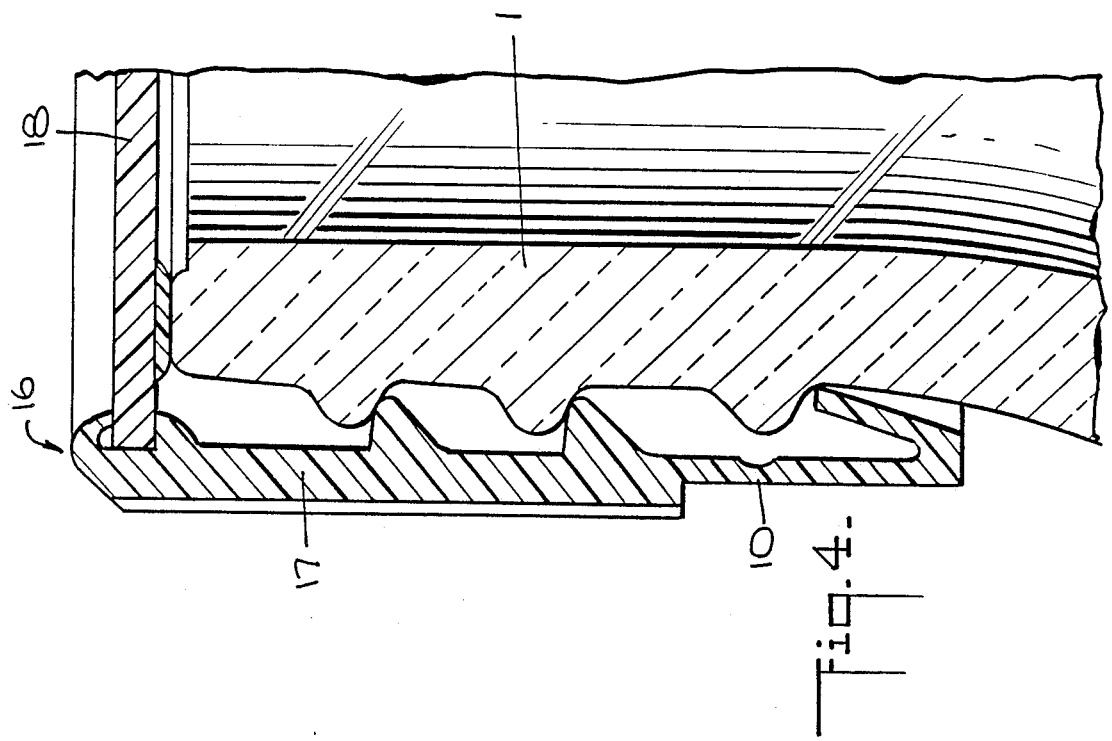
FIG. 4 is a partial vertical sectional view of another embodiment of a closure cap molded ring in accordance with the invention.

As illustrated in the figures, the closure for sealing container 1 comprises a composite cap 2 having a separate cover 3 and a molded ring portion 4. The cover 3 preferably comprises a cut or stamped plastic cover with a laminate or other type gasket 5. On the gasket 5 may be a screen printed or flowed-on plastisol gasket or a cut ring fastened to the rim of the cover 3 or the seal may rely upon the characteristics of a relatively soft plastic or cellulose, etc. cover under surface.

The cover 3 in certain instances is mounted on the upper portion of the plastic ring 4 by a plastic to plastic bond. In the cap 2 (FIG. 2) one preferred operation for attaching the cover 3 is by a spin welding operation where relative rotation is provided between the cover 3 and the ring 4.

By this method a relative rotation is provided between the cover 3 and the ring 4 creating a circular area of increased temperature for a welding 6 at the edge of the cover 3 and in the adjacent portion of the ring 4. The embodiment illustrated provides a mandrel 7 engaging and rotating the cover 3 while the ring 4 is held by a suitable clamp 8. Alternatively, the mandrel 7 may provide for a clamping of the cover 3 as the ring 4 is rotated. The ring 4 is preferably rotated with the stationery cover in cases where there may be a secondary cutting or swaging operation being performed on the plastic ring 4.

A variety of constructions may be used for the plastic cover 3 including solid covers cut from plastic sheets, a laminated or a co-extruded cover, as illustrated, which is formed of a number of layers 9 which may all be plastic or which may include a metallic or foil layer and or cellulose where additional properties may be desired. The usual plastic made use of for plastic closures may be used including polypropylene, polyethylene, polystyrene or others. The plastic is chosen so that the temperature achieved by the spin welding melt the similar marginal plastic edges of the cover and of the ring and provides a plastic welding or chemical adhesive action would be employed instead. The composite closures may include tamper evident bands 10 in the known construction and cutting or swaging operations on the bands may be performed during the spin welding step.

Figure 3:
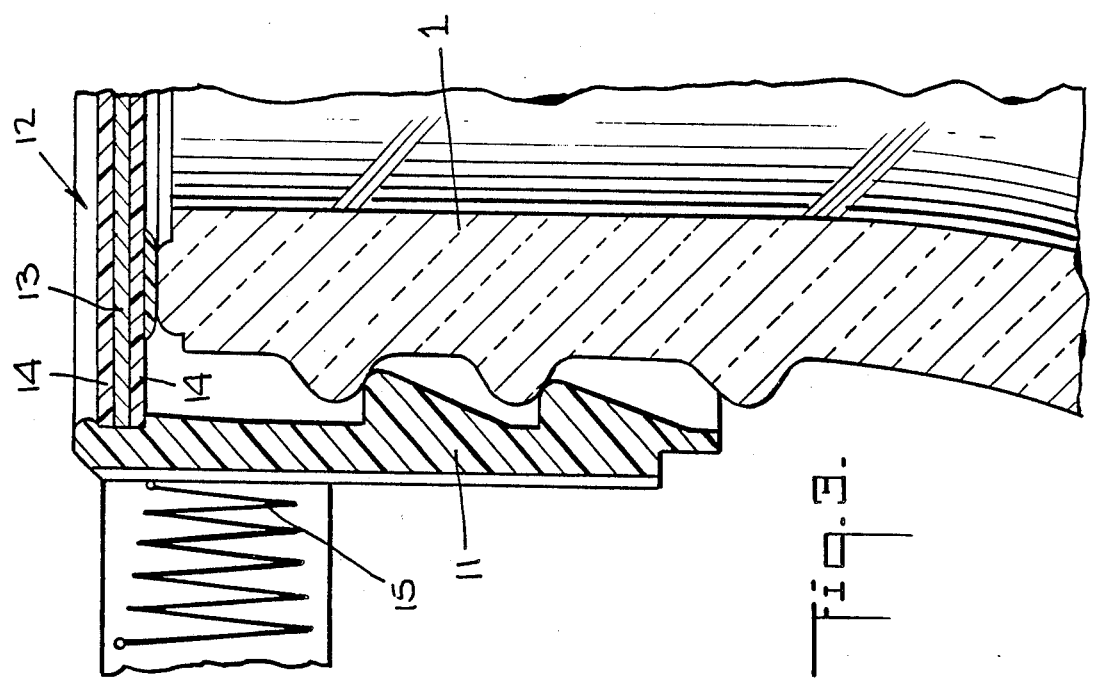
FIG. 3 is a partial vertical sectional view of another embodiment of a closure cap in accordance with the present invention.

FIG. 3 illustrates another embodiment where the attaching operation is based upon induction heating to provide the welding operation between the plastic ring 11 and the plastic cover 12. In this embodiment, a laminated cover 12 is provided which includes an aluminum or other metallic foil layer or disk 13. The cover 12 illustrated in FIG. 3 has the metallic foil disk 13 sandwiched between outer plastic or other layers 14. An induction heating coil 15 is moved into an encircling position around the plastic ring thereby generating the heating currents in the heat sink provided by the conducting foil disk 13. Excellent adhesion results where the induction heating source is directed, as illustrated, to the side of the plastic ring or alternatively, with the plastic ring 11 being rolled next to the induction heat source 15. As in the case of the spin welding operation, motion of the plastic ring 11 may also be used to perform additional cutting or bridging operations.

FIG. 4 illustrates an additional embodiment wherein the plastic attachment is provided by a swaging or deformation of a lip 16 or other preformed projection on the plastic ring 17 during which the lip or projection 16 is swaged or bent into tight engagement with the edge of the cover 18. For the case of a solid or laminated plastic cover, as illustrated, the lip or projection 16 on the ring 17 may be tightly forced against and into an interlocking engagement with the plastic of the cover 18. Alternatively, the plastic of the ring 17 may be swaged or bent into engagement with a cover 18 which is partially plastic or which may be entirely metallic although a minimal depression or interlocking action will be obtained between a plastic lip or projection 16 and a plastic cover 18.

It will be seen that an improved composite closure cap consisting of a plastic ring and an at least partially plastic cover has been provided together with an improved method of attaching the cover to the plastic ring. The novel attaching methods, as described, are relatively simple in operation and may be performed on existing machinery with only a minor additions or modifications.

As various changes may be made in the form, construction and arrangement of the invention and without departing from the spirit and scope of the invention, and without sacrificing any of its advantages, it is to be understood that all matter herein is to be interpreted as illustrative and not in a limiting sense.

Having thus described my invention, I claim:

1. In a composite closure for a container having a laminated plastic cover portion fitted into a ring portion and having container engaging members on the radially inner surface of said ring, the improvement comprising:

said ring comprising a cylindrical plastic member with a cover receiving groove positioned downwardly from the ring top and engaging the outer edge only of the cover portion, the said ring engaging an edge portion of said cover plastic, said laminated cover portion comprising a plurality plastic layers of generally equal and substantial thickness, and means adhering the cover portion to the said ring.

2. The composite closure as claimed in claim 1 in which said means adhering the cover portion to said ring is a spun weld.

3. The closure as claimed in claim 1 in which said means adhering the cover portion to said ring is an induction weld.

4. The closure as claimed in claim 1 which further comprises one of said layers of said cover being metallic.

5. The closure as claimed in claim 1 in which only means adhering the cover portion of said ring comprises a deformed portion of said ring.

* * * * *